(12) United States Patent
Nakamura

(10) Patent No.: US 8,860,840 B2
(45) Date of Patent: Oct. 14, 2014

(54) LIGHT SOURCE ESTIMATION DEVICE, LIGHT SOURCE ESTIMATION METHOD, LIGHT SOURCE ESTIMATION PROGRAM, AND IMAGING APPARATUS

(71) Applicant: Sony Corporation, Tokyo (JP)

(72) Inventor: Kenji Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 13/672,261

(22) Filed: Nov. 8, 2012

(65) Prior Publication Data

US 2013/0120608 A1 May 16, 2013

(30) Foreign Application Priority Data

Nov. 16, 2011 (JP) ................................. 2011-250269

(51) Int. Cl.
  *H04N 9/73* (2006.01)
(52) U.S. Cl.
  CPC ..................................... *H04N 9/735* (2013.01)
  USPC ........................................................ 348/223.1
(58) Field of Classification Search
  CPC .................................. H04N 9/73; H04N 9/735
  USPC ............................................. 348/223.1–225.1
  See application file for complete search history.

(56) References Cited

U.S. PATENT DOCUMENTS

2007/0120987 A1* 5/2007 Kobayashi .................. 348/223.1
2008/0211925 A1* 9/2008 Misawa et al. .............. 348/223.1

FOREIGN PATENT DOCUMENTS

JP  2007-300253  11/2007

* cited by examiner

*Primary Examiner* — Timothy J Henn
(74) *Attorney, Agent, or Firm* — Sony Corporation

(57) ABSTRACT

A light source estimation device includes: a light-source-estimation area setting section configured to detect a background in an image and to set a light-source-estimation area on the basis of a result of the background detection; and a light source estimation section configured to estimate a type of a light source when the image is captured on the basis of the light-source-estimation area.

8 Claims, 11 Drawing Sheets

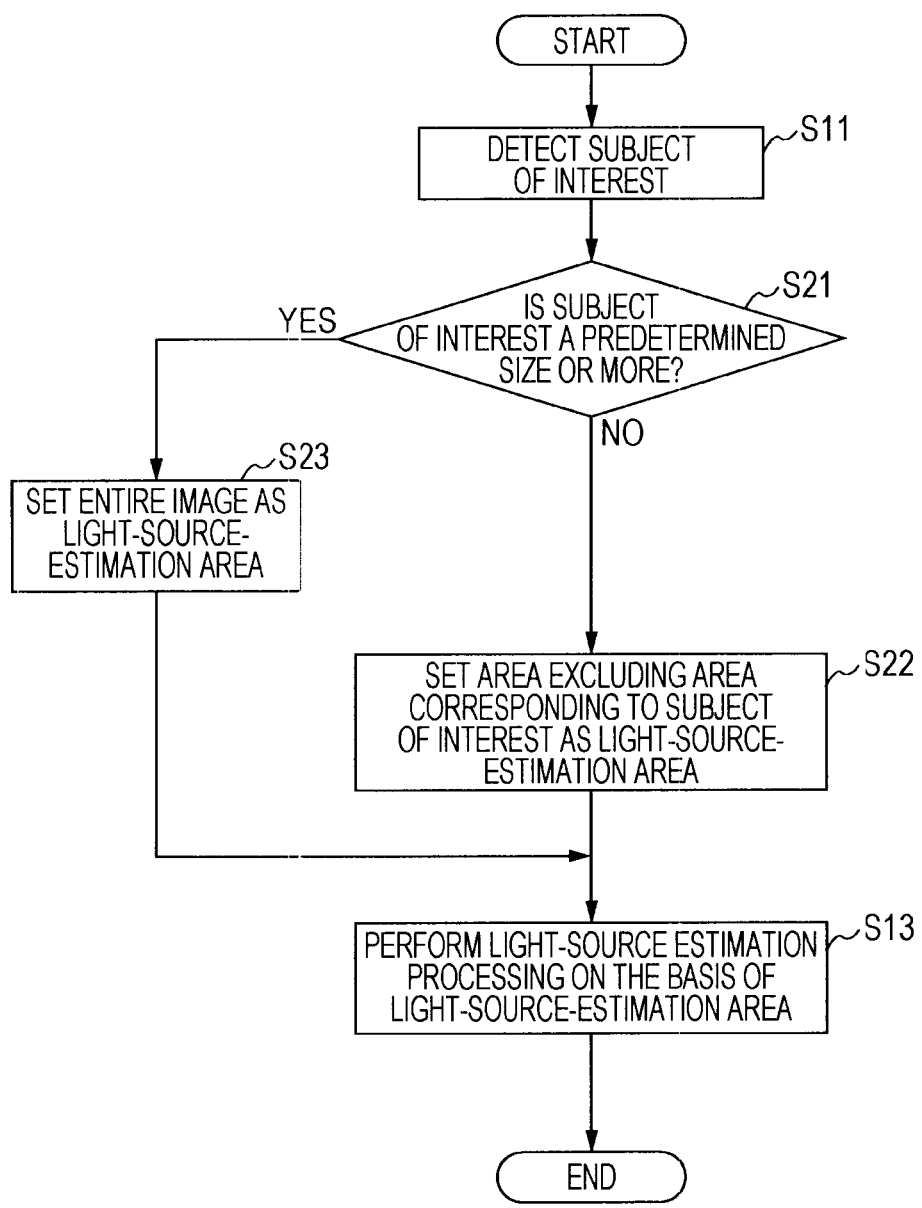

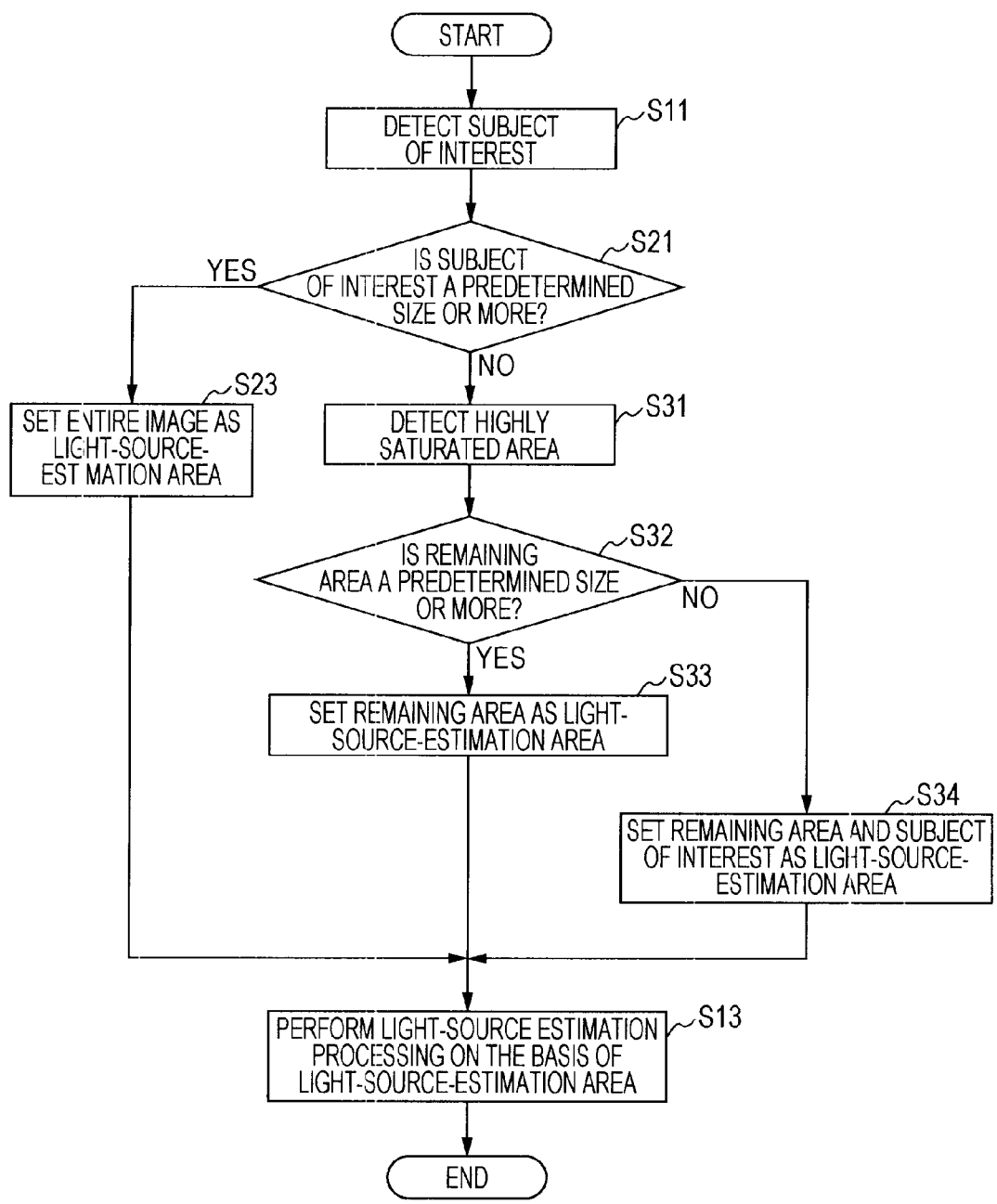

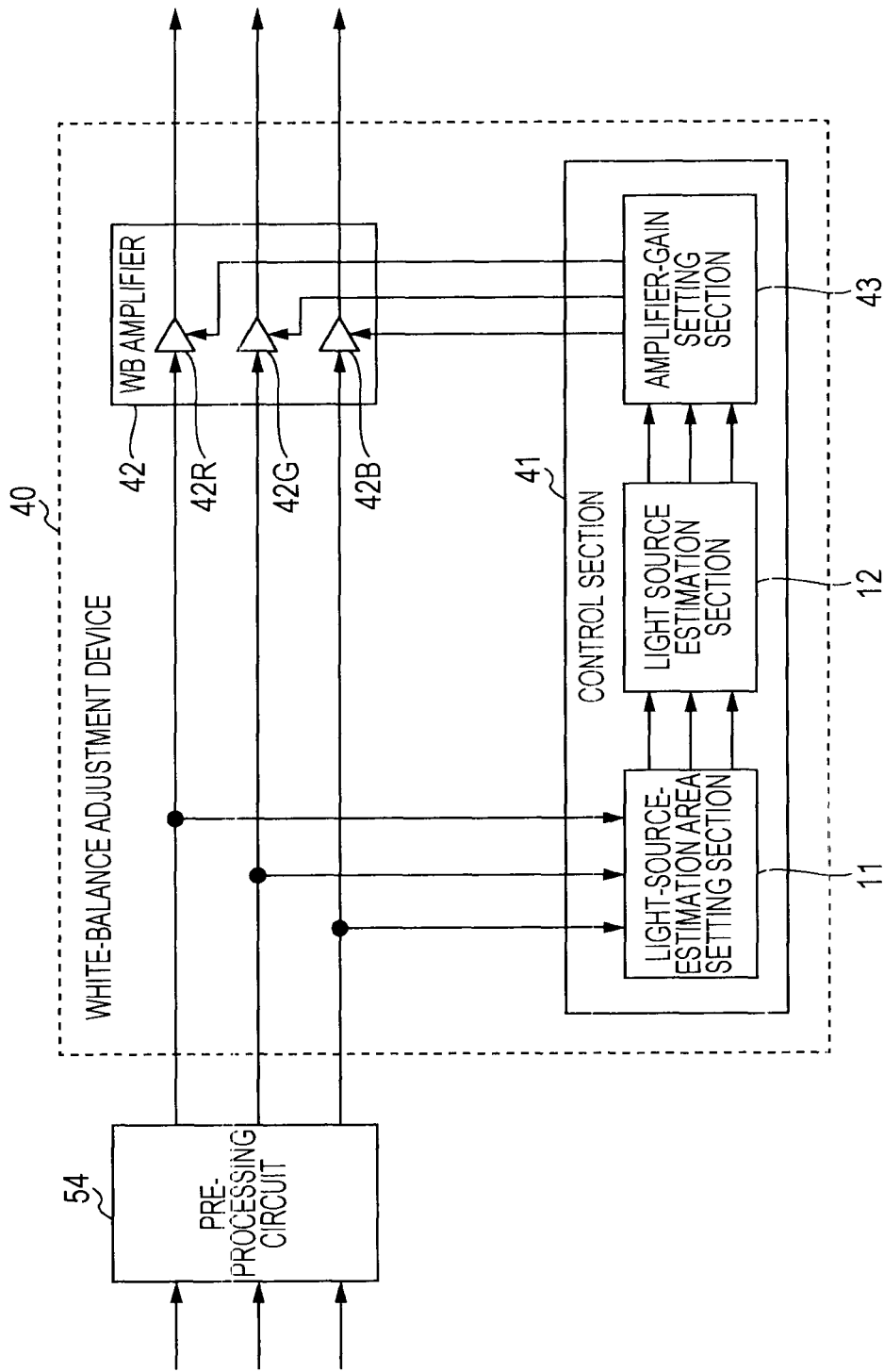

LIGHT SOURCE ESTIMATION DEVICE, LIGHT SOURCE ESTIMATION METHOD, LIGHT SOURCE ESTIMATION PROGRAM, AND IMAGING APPARATUS

BACKGROUND

The present technique relates to a light source estimation device, a light source estimation method, a light source estimation program, and an imaging apparatus.

To date, many of digital still cameras and digital video cameras that capture a still image and a moving image, respectively, have been provided with an auto-white-balance adjustment function that automatically performs white-balance adjustment processing.

White balance adjustment is processing for reproducing suitable color under a shooting light source by performing correction so that white color is taken a picture of true white color correctly. In general, auto white balance is performed by providing gains for each of R, G, and B signals in image signals so that output levels of the R signal, the G signal, and the B signal become equal in a white color point to be a reference in an image. Many of digital still cameras are provided with a so-called auto white balance function that performs white balance adjustment automatically.

The auto-white-balance adjustment processing is processing for correctly displaying white color in accordance with a color temperature of a shooting light source. Thus, a shooting light source is estimated as a pre-stage of auto-white-balance adjustment processing (Japanese Unexamined Patent Application Publication No. 2007-300253). For shooting light sources, for example, sunlight, an incandescent lamp, a fluorescent lamp, etc., are provided.

SUMMARY

In order to perform auto-white-balance adjustment, first, for example, white balance control values that are suitable for a plurality of light sources described above, respectively, are determined as preset values in advance. And a shooting light source is estimated, and then a preset value corresponding to the estimated shooting light source is selected. Accordingly, if a difference occurs in an estimation result of the shooting light source, auto-white-balance processing is not performed suitably because of the estimation result.

The present technique has been made in view of these points. It is desirable to provide a light source estimation device, a light source estimation method, a light source estimation program, and an imaging apparatus that are capable of determining a shooting light source with high precision.

According to an embodiment of the present disclosure, there is provided a light source estimation device including: a light-source-estimation area setting section configured to detect a background in an image and to set a light-source-estimation area on the basis of a result of the background detection; and a light source estimation section configured to estimate a type of a light source when the image is captured on the basis of the light-source-estimation area.

Also, according to another embodiment of the present disclosure, there is provided a method of estimating a light source, the method including: detecting a background in an image and setting a light-source-estimation area on the basis of a result of the detecting the background; and estimating a type of the light source when the image is captured on the basis of the light-source-estimation area.

Also, according to another embodiment of the present disclosure, there is provided a program for causing a computer to perform a method of estimating a light source, the method including: detecting a background in an image and setting a light-source-estimation area on the basis of a result of the detecting the background; and estimating a type of the light source when the image is captured on the basis of the light-source-estimation area.

Also, according to another embodiment of the present disclosure, there is provided an imaging apparatus including: an imaging section configured to convert incident light into an electronic signal by capturing an image to generate an image signal; a light-source-estimation area setting section configured to detect a background in the image generated by the imaging section and to set a light-source-estimation area on the basis of a result of the background detection; and a light source estimation section configured to estimate a type of a light source when the image is captured on the basis of the light-source-estimation area.

By the present technique, it is possible to increase precision of estimation of a shooting light source.

BRIEF DESCRIPTION OF THE DRAWINGS

FIG. 4 is a flowchart illustrating a flow of light source estimation processing according to a second embodiment;

FIG. 7 is a flowchart illustrating a flow of light source estimation processing according to the third embodiment;

FIG. 10 is a block diagram illustrating a configuration of a white-balance adjustment device including a light source estimation device.

DETAILED DESCRIPTION OF EMBODIMENTS

Figure 1:
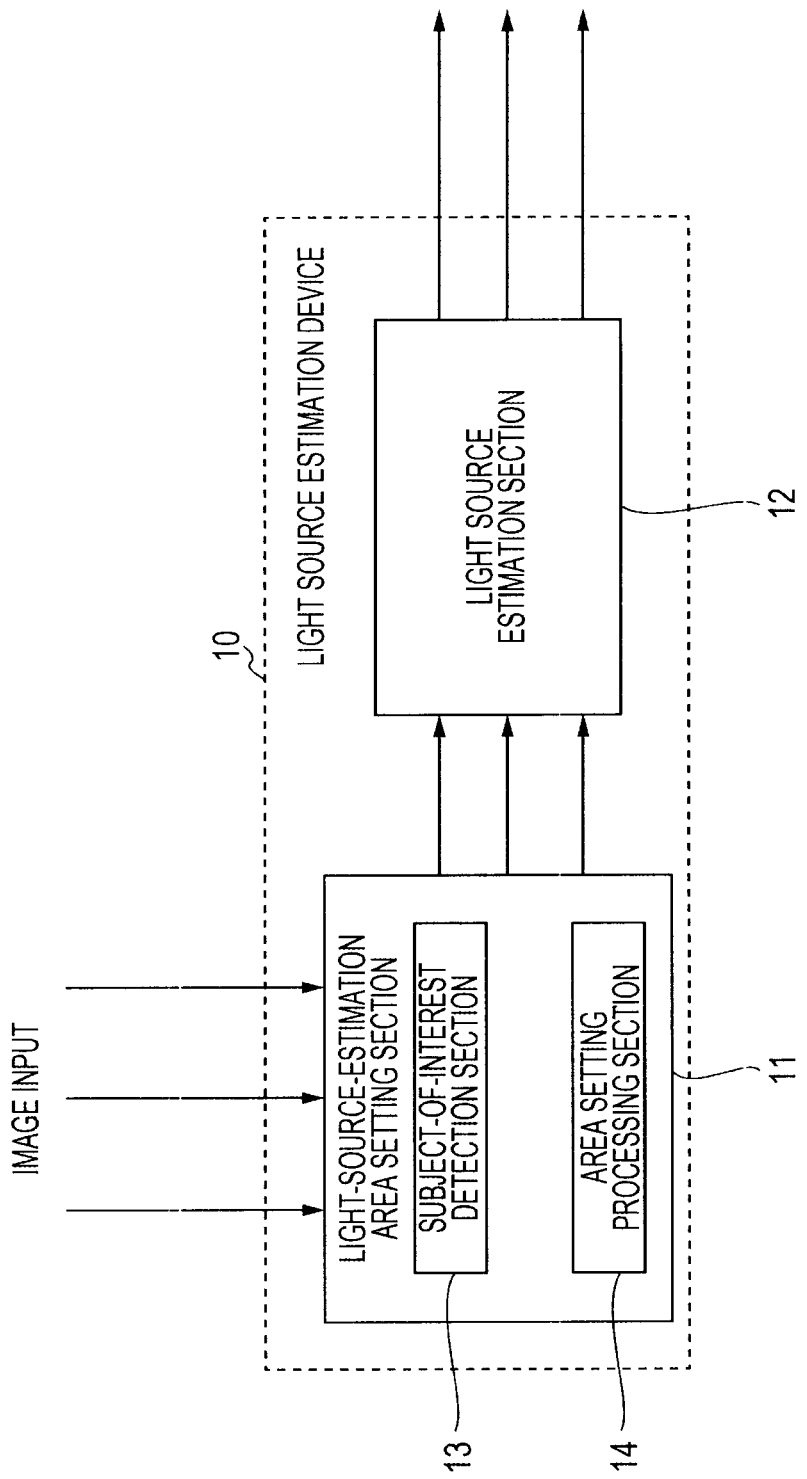
FIG. 1 is a block diagram illustrating a configuration of a light source estimation device according to the present technique.

In the following, descriptions will be given of embodiments of the present technique with reference to the drawings. However, the present technique is not limited only to the following embodiments. In this regard, the descriptions will be given in the following order.

1. First embodiment
   1.1 Configuration of light source estimation device
   1.2 Light source estimation processing
2. Second embodiment
   2.1 Light source estimation processing
3. Third embodiment
   3.1 Configuration of light source estimation device
   3.2 Light source estimation processing 4. Configuration of white-balance adjustment device including light source estimation device 5. Configuration of imaging apparatus including light source estimation device and white-balance adjustment device 6. Variations

1. First Embodiment

1.1 Configuration of Light Source Estimation Device

FIG. 1 is a block diagram illustrating a configuration of a light source estimation device 10 according to a first embodiment of the present technique. The light source estimation device 10 includes a light-source-estimation area setting section 11 and a light source estimation section 12. Also, the light-source-estimation area setting section 11 includes a subject-of-interest detection section 13 and an area setting processing section 14.

The light source estimation device 10 includes, for example, a CPU (Central Processing Unit), a RAM (Random Access Memory), a ROM (Read Only Memory), etc., and is achieved by executing a predetermined program, etc. The ROM stores programs, etc., which are read and operated by the CPU. The RAM is used as a work memory of the CPU. The CPU performs various kinds of processing in accordance with the programs stored in the ROM so as to function as the light-source-estimation area setting section 11, the subject-of-interest detection section 13, the area setting processing section 14, and the light source estimation section 12.

However, the light source estimation device 10 may be achieved not only by software, but also may be achieved by a combination of hardware having functions of the light-source-estimation area setting section 11 and the light-source estimation section 12, respectively.

The light-source-estimation area setting section sets an area (hereinafter referred to as a light-source-estimation area) to be used for light source estimation processing of the input image. The light-source-estimation area setting section 11 includes the subject-of-interest detection section 13 and the area setting processing section 14.

The subject-of-interest detection section 13 detects a subject of interest from subjects in the image. The "subject of interest" is a subject to which a user attaches importance in order to obtain a preferable picture composition, and is a person, an animal, or a building, etc., for example. In this regard, the subject of interest is not limited to one, and a plurality of subjects of interest may be detected. For a method of detecting a subject of interest, it is possible to use a face detection technique, a person detection technique, an object detection technique, etc., which ate public knowledge using template matching, etc.

Also, it is possible to employ a method of determining a subject having a motion vector of a predetermined amount or more to be a subject of interest using motion vectors. It is thought that a background portion other than a subject of interest normally has little motion. Also, it is possible to detect a subject of interest using luminance values of an image. For example, it is thought that an area having luminance of a predetermined threshold value or more is a subject of interest, and an area having luminance of a predetermined threshold value or less is a background other than the subject of interest. It is thought that the user attaches importance to a subject of interest, and thus the subject of interest is often taken in a brighter picture than the other subjects. In this regard, rather than using any one of the various methods described above, a plurality of the methods may be combined in order to increase precision in detection of a subject of interest.

The area setting processing section 14 determines an area produced by excluding an area corresponding to the subject of interest from the image using a detection result of the subject-of-interest detection section 13 to be a background in the image. And the area setting processing section 14 sets the background as a light-source-estimation area in the image. The "background" means an area excluding an area corresponding to the subject of interest from the image.

In this regard, the light-source-estimation area setting section 11 may directly detect the background, and obtain the detected background as a light-source-estimation area. For example, it is possible to determine that an area in focus is a subject of interest on the basis of a focus position, a zoom ratio, etc., and the other area out of focus is a background for detecting a background. Light-source-estimation areas to be set become the same by a method of detecting a subject of interest and by a method of detecting a background.

Also, it is not necessarily that a background has to be detected, and thus after an area of interest is extracted, a place of the area may be subjected to inversion determination (removed), or degrees of interest on the entire image may be calculated and signal values may be processed inversely proportional to the degrees of interest. As long as an object is achieved, means for achieving the object is not limited in any way. For a method of calculating degree of interest, any method may be applied, for example, a saliency map of a visual attention technique may be used, a distance to a subject may be used, and a pixel threshold value may be used. As a technique for correctly identifying an area of a subject in an image using a visual attention, for example, techniques described in Japanese Unexamined Patent Application Publication Nos. 2010-266982, 2011-146826, and 2010-262506, etc., can be used. As a technique for calculating a distance to a subject, a technique described in Japanese Unexamined Patent Application Publication No. 2010-169709, etc., can be used.

The light source estimation section 12 estimates a type of light source at the time of capturing an input image on the basis of the light-source-estimation area in the image, which has been set by the light-source-estimation area setting section 11. An area that is excluded from the image, and not included in the light-source-estimation area is not used for light source estimation. Accordingly, in the first embodiment, a subject of interest is not used for light source estimation.

It is possible to use various kinds of existing techniques for a method of estimating a light source. For example, signal component detection is performed, and a current shooting light source is estimated on the basis of the detection result. Also, it is possible to estimate a light source from distribution of color signals. Also, the values indicating intensities of a light source obtained by RGB pixel signals are projected onto an evaluation space, blackbody radiation locus, features of light intensities of given light source on the evaluation space, etc., are added, and thereby the light source in a shooting environment is estimated. The estimated light sources include daytime sunlight, sunlight in the shade, incandescent lamp, white fluorescent lamp, LED, etc., for example.

The light source estimation device 10 according to the first embodiment is configured as described above.

1.2 Light Source Estimation Processing

Figure 2:
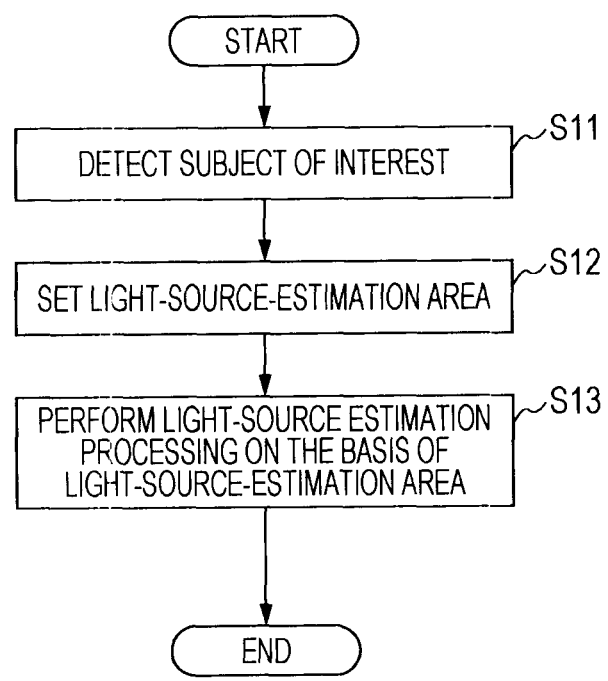
FIG. 2 is a flowchart illustrating a flow of light source estimation processing according to a first embodiment.

Next, a description will be given of light source estimation processing performed by the light source estimation device 10 with reference to a flowchart in FIG. 2. First, in step S11, the subject-of-interest detection section 13 in the lightsource-estimation area setting section 11 detects a subject of interest in an image. Information indicating the detected subject of interest is supplied to the area setting processing section 14. Next, in step S12, the area setting processing section 14 in the light-source-estimation area setting section 11 sets a background that is an area produced by excluding an area corresponding to a subject of interest from the image as a light-source-estimation area. The information indicating the light-source-estimation area is supplied to the light source estimation section 12. And, in step S13, the light source estimation section 12 performs light source estimation processing on the basis of the set light-source-estimation area.

Figure 3A:
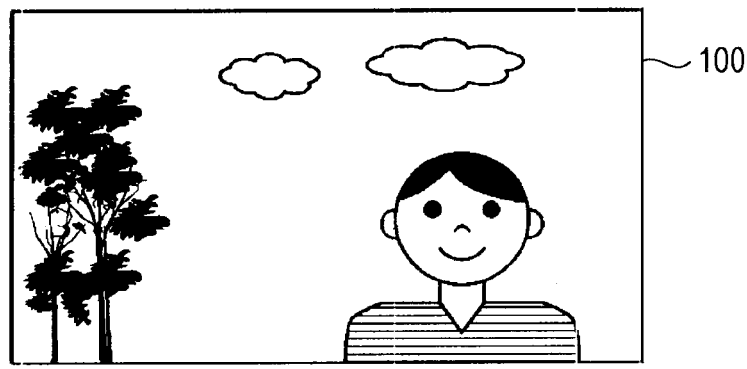
FIGS. 3A, 3B, and 3C are diagrams illustrating specific examples of the light source estimation processing according to the first embodiment, respectively.
Figure 3B:
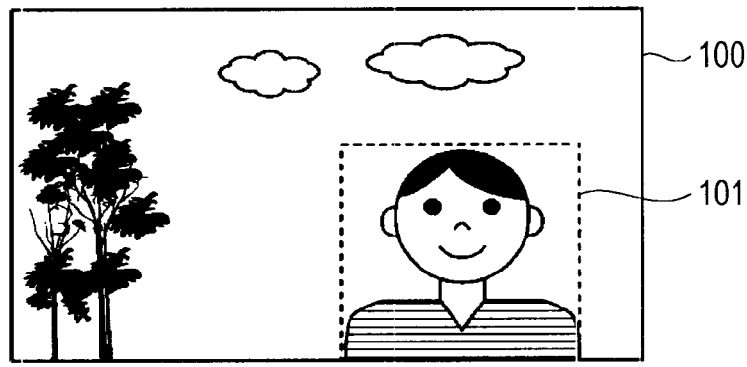
Figure 3C:
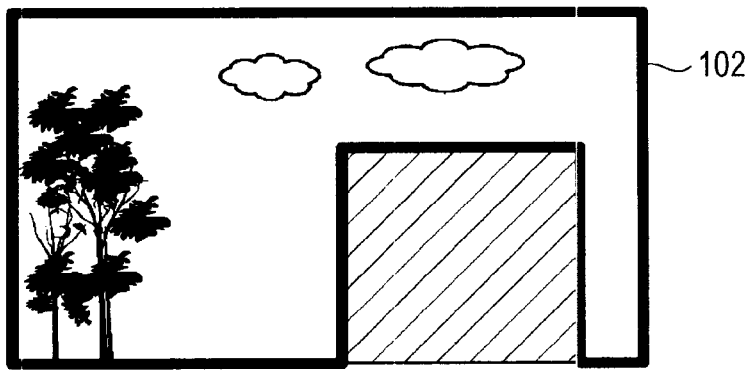

A description will be given of the light source estimation processing in the first embodiment using an example of a specific image with reference to FIGS. 3A, 3B, and 3C. As illustrated in FIG. 3A, a person is taken as a subject of interest in an image 100. And as illustrated in FIG. 3B, the subject-of-interest detection section 13 in the light-source-estimation area setting section 11 detects the person as a subject of interest 101. Then, as illustrated in FIG. 3C, the area setting processing section 14 of the light-source-estimation area setting section 11 sets a background that is an area produced by removing an area corresponding to the subject of interest 101 from the image 100 as a light-source-estimation area 102. In FIG. 3C, an area indicated by slant lines is the excluded area, and the remaining area surrounded by a bold line is set as the light-source-estimation area 102. The light source estimation processing is performed on the basis of the light-source-estimation area 102.

In general, a subject of interest often has various colors in an image, and a background other than a subject of interest often has an achromatic color or a faint color. Accordingly, it is possible to obtain a neutral color with high precision by the use of only an area excluding the subject of interest for light source estimation, and thus to increase precision of light source estimation.

2. Second Embodiment

2.1 Light Source Estimation Processing

Next, a description will be given of a light source estimation device according to a second embodiment of the present technique. A configuration of the light source estimation device according to the second embodiment is the same as that of the first embodiment, and thus a description thereof will be omitted. FIG. 4 is a flowchart illustrating a flow of light source estimation processing according to the second embodiment.

The second embodiment is different from the first embodiment in that step S21, step S22, and step S23 are performed. In this regard, the step S11 and the step S13 are the same as those of the first embodiment, respectively. In the second embodiment, if a subject of interest is greater than a predetermined size, light source estimation is performed not on an area excluding the subject of interest, but on the entire image.

First, in step S11, the subject-of-interest detection section 13 of the light-source-estimation area setting section 11 detects a subject of interest from an image. Next, in step S21, the area setting processing section 14 of the light-source-estimation area setting section 11 determines whether or not the subject of interest is a predetermined size or more. This determination is made, for example, by comparing a number of all the pixels included in the subject of interest and a comparative number of pixels determined as a predetermined threshold value. If the number of pixels included in the subject of interest is the comparative number of pixels or more, it is possible to determine that the subject of interest is a predetermined size or more. Also, the determination may be made not by a comparison with a specific number of pixels. If the number of pixels of a subject of interest occupies a predetermined ratio of the number of pixels of the entire image, the subject of interest may be determined to be a predetermined size or more.

If determined that the subject of interest is not a predetermined size or more, the processing proceeds to step S22 (No in step S21). And in the same manner as the first embodiment, the area setting processing section 14 of the light-source-estimation area setting section 11 sets a background that is an area produced by excluding an area corresponding to the subject of interest from the image as a light-source-estimation area. And in step S13, the light source estimation section 12 performs light source estimation processing on the basis of the light-source-estimation area.

On the other hand, if determined that the subject of interest is a predetermined size or more in step S21, the processing proceeds to step S23 (Yes in step S21). And in step S23, the area setting processing section 14 of the light-source-estimation area setting section 11 sets the entire image as a light-source-estimation area. And in step S13, the light source estimation section 12 performs light source estimation processing on the basis of the light-source-estimation area.

Figure 5A:
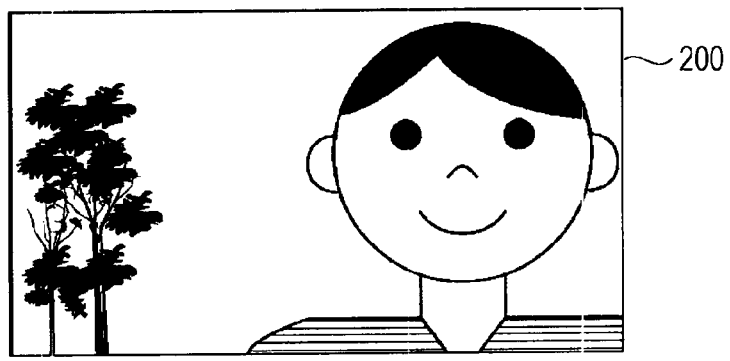
FIGS. 5A, 5B, and 5C are diagrams illustrating specific examples of the light source estimation processing according to the second embodiment, respectively.
Figure 5B:
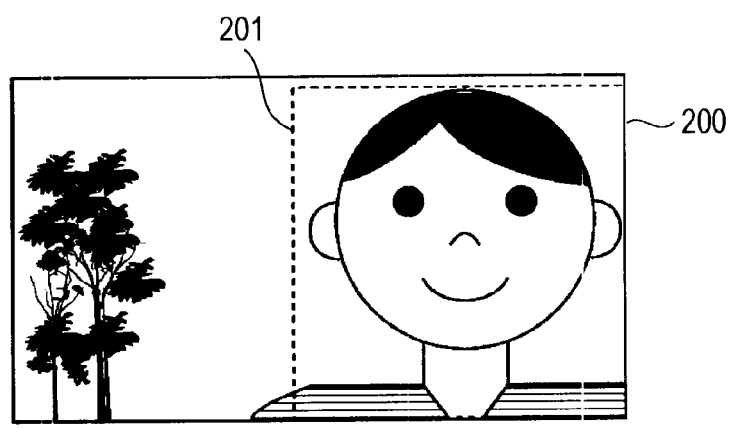
Figure 5C:
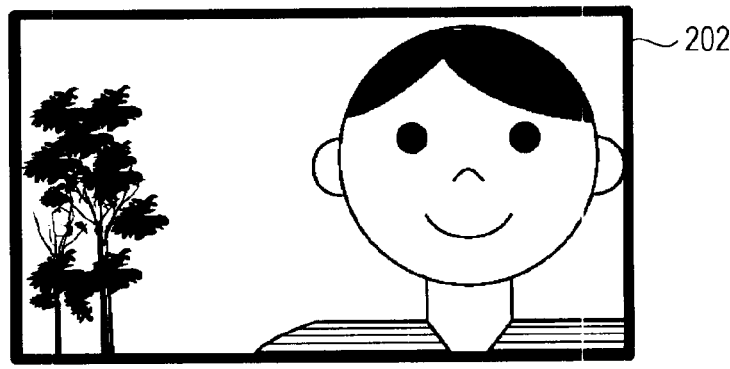

Next, with reference to FIGS. 5A, 5B, and 5C, a description will be given of the light source estimation processing in the second embodiment using an example of a specific image. As illustrated in FIG. 5A, a person is in an image 200. And, as illustrated in FIG. 5B, the subject-of-interest detection section 13 of the light-source-estimation area setting section 11 detects that the person is a subject of interest 201. However, the subject of interest 201 is larger than a predetermined size, and thus as illustrated in FIG. 5C, the entire image surrounded by a bold line is set as a light-source-estimation area 202. On the other hand, if the subject of interest 201 is a predetermined size or less, in the same manner as the example illustrated in FIGS. 3A, 3B, and 3C in the first embodiment, a background that is an area produced by excluding an area corresponding to the subject of interest is set as the light-source-estimation area.

In this manner, by the second embodiment, if a subject of interest is large in an image, light source estimation is performed not on an area excluding the subject of interest, but on the basis of the entire image. This is because if a subject of interest is large, an area excluding the subject of interest becomes narrow, and thus precision of the light source estimation decreases. Accordingly, if the subject of interest is large, light source estimation is performed using the entire image as the light-source-estimation area so that a decrease in precision of light source estimation is prevented.

3. Third Embodiment

3.1 Configuration of Light Source Estimation Device

Figure 6:
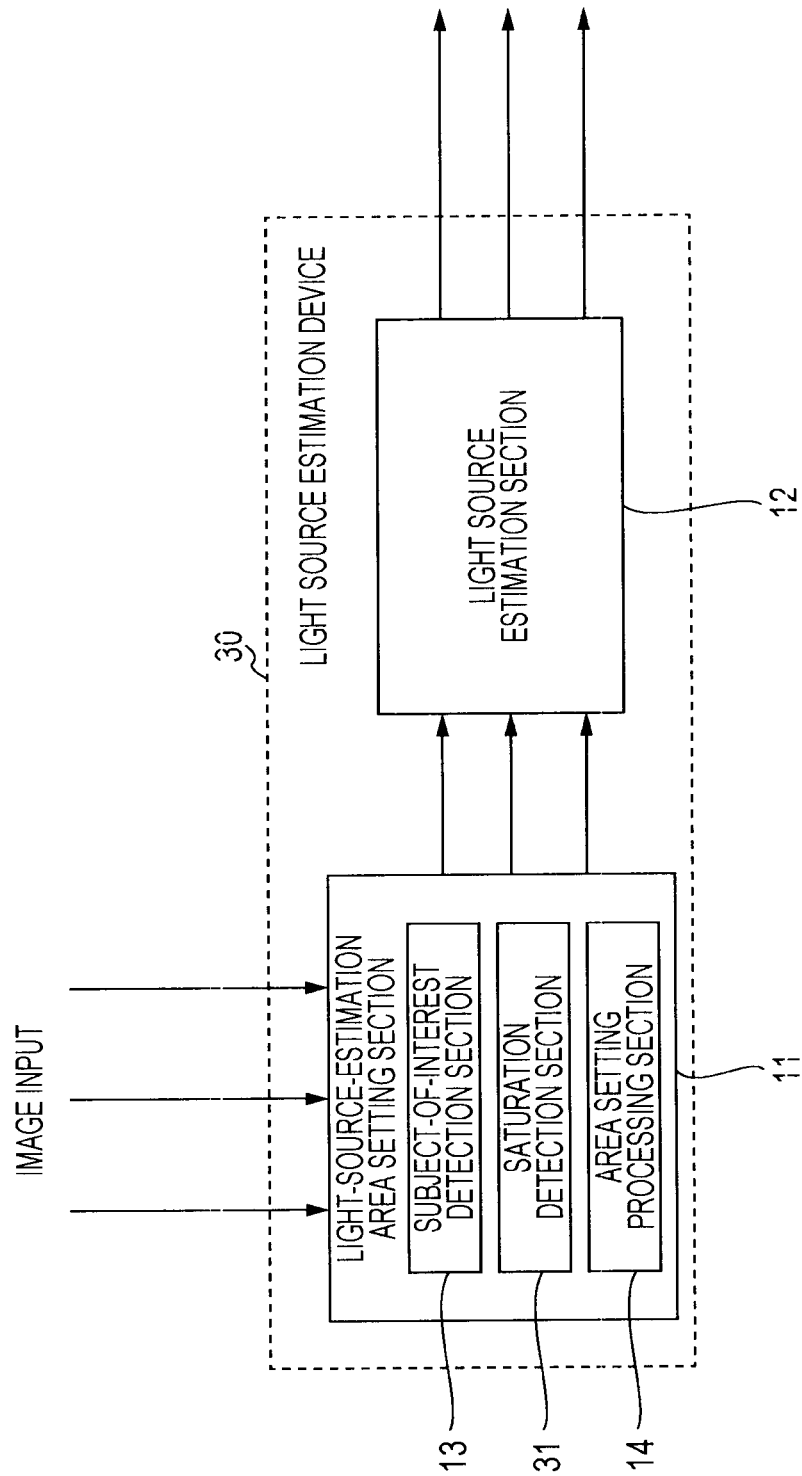
FIG. 6 is a block diagram illustrating a configuration of a light source estimation device according to a third embodiment.

Next, a description will be given of a light source estimation device 30 according to a third embodiment of the present technique. FIG. 6 is a block diagram illustrating a configuration of the light source estimation device 30 according to a third embodiment. The third embodiment is different from the first and second embodiments in that the light-source-estimation area setting section 11 includes a saturation detection section 31. The subject-of-interest detection section 13 and the light source estimation section 12 are the same as those of the first and the second embodiments.

The saturation detection section 31 detects, for example, saturation from color difference signals U and V in an image. And, the saturation detection section 31 detects a range in which saturation is a predetermined threshold value or more, that is to say, an area having high saturation (hereinafter referred to as a highly saturated area). A threshold value to be compared with saturation may be set by a user, or may be set by default in advance. Also, the threshold value may be dynamically changed in accordance with the image. A detection result by the saturation detection section 31 is supplied to the area setting processing section 14. The area setting processing section 14 sets a light-source-estimation area in the image on the basis of the detection results from the subject-of-interest detection section 13 and the saturation detection section 31. Information indicating the set light-source-estimation area is supplied to the light source estimation section 12. The light source estimation section 12 performs light source estimation processing on the basis of the light-source-estimation area.

3.2 Light Source Estimation Processing

Next, a description will be given of light source estimation processing according to the third embodiment. FIG. 7 is a flowchart illustrating a flow of light source estimation processing according to the third embodiment. In this regard, step S11 and step S13 are the same as those in the first embodiment. Also, step S21 and step S23 are the same as those in the second embodiment, and thus the descriptions thereof will be omitted.

A subject of interest is detected in step S11, and if determined that the subject of interest is not a predetermined size or more in step S21, the processing proceeds to step S31 (No in step S21). Next, in step S31, the saturation detection section 31 detects saturation for all the image, and determines a highly saturated area that is an area having saturation of a predetermined threshold value or more.

Next, in step S32, the area setting processing section 14 determines whether or not an area (hereinafter referred to as a remaining area) produced by excluding the subject of interest and the highly saturated area from the entire image is a predetermined size or more. This determination is made, for example, by comparing a number of pixels in the remaining area and a comparative number of pixels determined as a predetermined threshold value. If the number of pixels in the remaining area is the comparative number of pixels or more, it is possible to determine that the remaining area is a predetermined size or more. Also, the determination may be made not by a comparison with a specific number of pixels. If the number of pixels in the remaining area occupies a predetermined ratio of the number of pixels of the entire image, the remaining area may be determined to be a predetermined size or more. In this regard, "a predetermined size" mentioned here is different from "a predetermined size" in step S21.

The predetermined size to be compared with the remaining area is, for example, half a size of the entire image, etc. The predetermined size may be set by a user in any way, or may be set by default in advance. Also, the predetermined size may be changed dynamically in accordance with the image.

And in step S32, if determined that the remaining area is a predetermined size or more, the processing proceeds to step S33 (Yes in step S32). In step S33, the light-source-estimation area setting section 11 sets the remaining area as a light-source-estimation area. And in step S13, the light source estimation section 12 performs light source estimation processing or the basis of the light-source-estimation area.

On the other hand, in step S32, if determined that the remaining area is not a predetermined size or more, the processing proceeds to step S34 (No in step S32). In step S34, the area setting processing section 14 for light-source-estimation sets an area including the remaining area and the subject of interest as a light-source-estimation area. And in step S13, the light source estimation section 12 performs light source estimation processing on the basis of the light-source-estimation area.

Figure 8A:
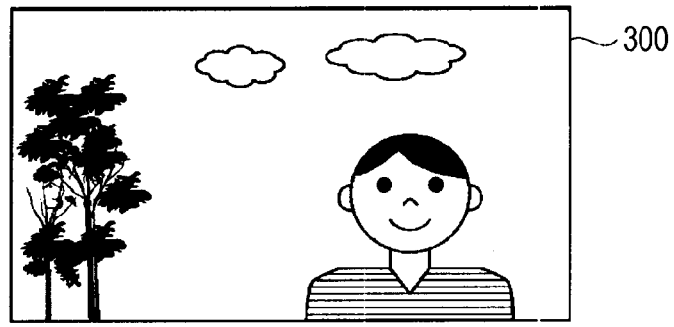
FIGS. 8A, 8B, 8C, and 8D are diagrams illustrating specific examples of the light source estimation processing according to the third embodiment, respectively.
Figure 8B:
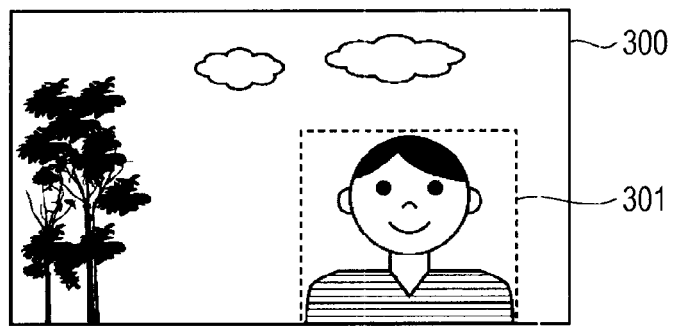
Figure 8C:
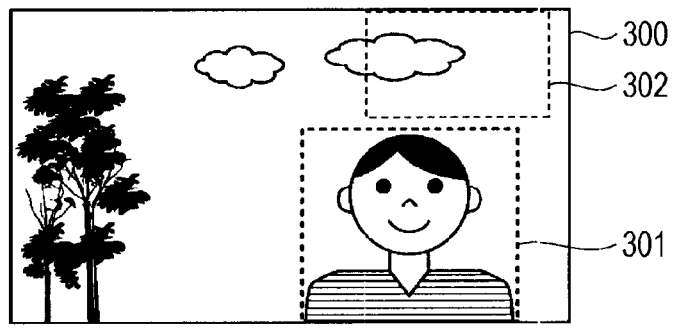
Figure 8D:
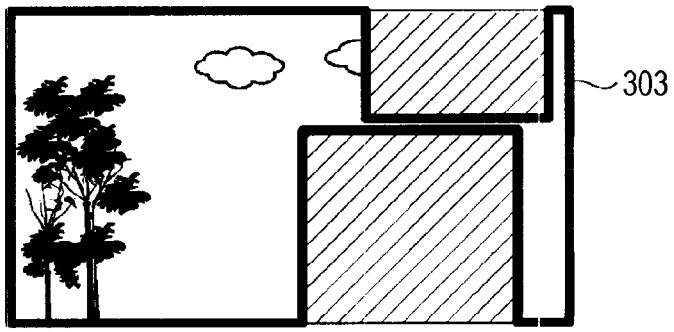

A description will be given of light source estimation processing in the third embodiment with reference to FIGS. 8A, 8B, 8C, and 8D, and FIGS. 9A, 9B, 9C, and 9D. As illustrated in FIG. 8A, an image 300 contains a person as a subject of interest. And as illustrated in FIG. 8B, the subject-of-interest detection section 13 of the light-source-estimation area setting section 11 detects the person as a subject of interest 301. Also, as illustrated in FIG. 8C, the saturation detection section 31 of the light-source-estimation area setting section 11 detects a highly saturated area 302. And if a remaining area produced by excluding the subject of interest 301 and the highly saturated area 302 is a predetermined size or more, as illustrated in FIG. 8D, the remaining area is set as a light-source-estimation area 303. Areas indicated by slant lines in FIG. 8D are excluded areas, and an area other than that, surrounded by a bold line, is a remaining area set as the light-source-estimation area 303.

Figure 9A:
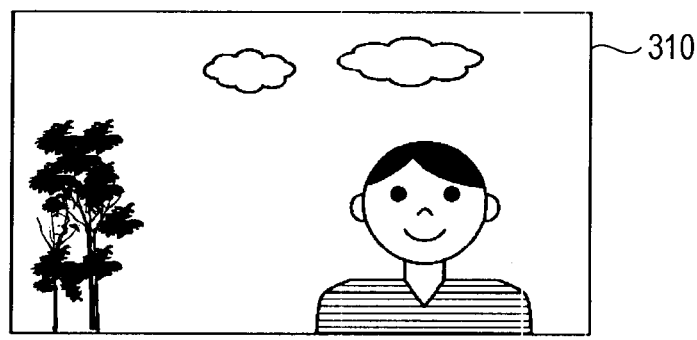
FIGS. 9A, 9B, 9C, and 9D are diagrams illustrating specific examples of the light source estimation processing according to the third embodiment, respectively.
Figure 9B:
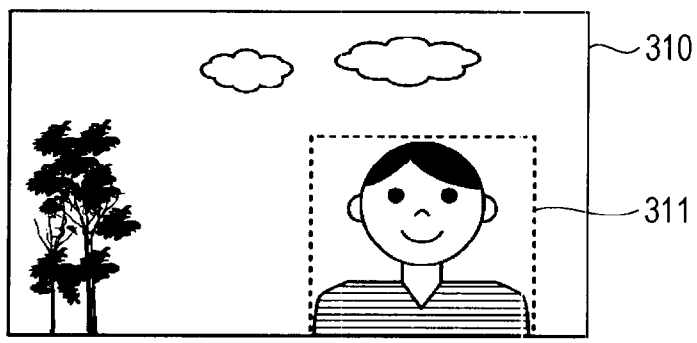
Figure 9C:
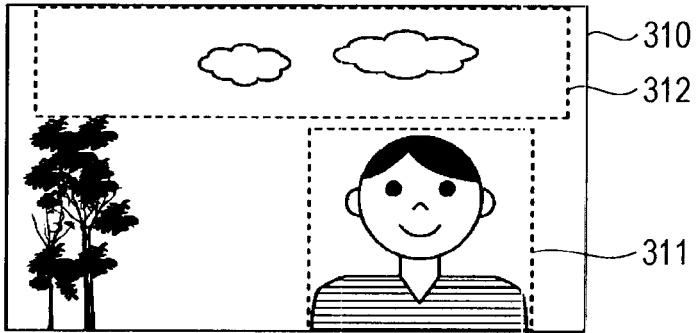
Figure 9D:
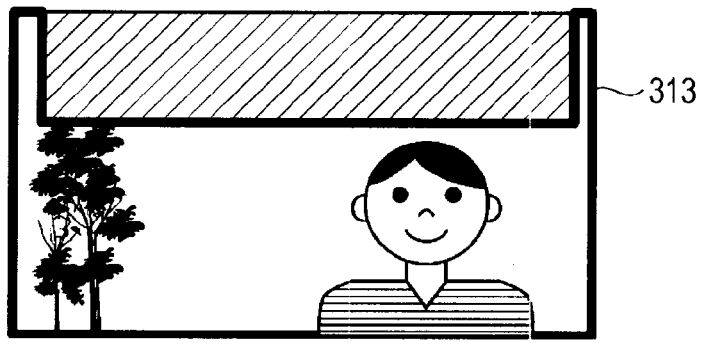

In the same manner, an image 310 contains a person in FIG. 9A. And as illustrated in FIG. 9B, the subject-of-interest detection section 13 of the light-source-estimation area setting section 11 detects the person as a subject of interest 311. Also, as illustrated in FIG. 9C, the saturation detection section 31 of the light-source-estimation area setting section 11 detects a highly saturated area 312. And a remaining area that is an area excluding the subject of interest 311 and the highly saturated area 312 is not a predetermined size or more (if the remaining area is narrow), as illustrated in FIG. 9D, an area including the remaining area and the subject of interest is set as a light-source-estimation area 313. In FIG. 9D, an area indicated by slant lines is a highly saturated area, and thus is an excluded area, and an area other than that, surrounded by a bold line, is an area set as the light-source-estimation area 313.

In this manner, by the third embodiment, if there is a highly saturated area in an image, the highly saturated area and the subject of interest are excluded from the light-source-estimation area. Thereby, neutral color of a light source is obtained with high precision, and thus it is possible to increase precision of light source determination. However, when a remaining area that is an area excluding a highly saturated area and a subject of interest is narrow, if the remaining area is determined to be a light source estimation area, precision of light source estimation is deteriorated. Accordingly, when the remaining area is narrow, an area excluding a highly saturated area is determined to be a light-source-estimation area, and light source estimation is performed so that deterioration of precision of light source estimation is prevented.

4. Configuration of White-Balance Adjustment Device Including Light Source Estimation Device A result of the light source estimation by the light source estimation device configured as described above is used, for example, for white-balance adjustment processing. Thus, a description will be given of a white-balance adjustment device 40 including a light source estimation device. FIG. 10 is a block diagram illustrating a configuration of the white-balance adjustment device 4C.

The white-balance adjustment device 40 includes a control section 41 and a white balance amplifier 42. The control section 41 includes a CPU, a RAM, a ROM, etc., and functions as a light-source-estimation area setting section 11, a light source estimation section 12 and an amplifier-gain setting section 43 by executing a predetermined program. The light-source-estimation area setting section 11 and the light source estimation section 12 constitute the light constitute the source estimation device, and are the same as those in the first to the third embodiments described above, and thus descriptions thereof will be omitted.

For example, RGB image signals are supplied from a pre-processing circuit 54 included in the imaging apparatus to the light-source-estimation area setting section 11. The pre-processing circuit 54 performs, for example, CDS (Correlated Double Sampling) processing on an imaging signal output from an image sensor in order to perform sample holding so as to maintain an S/N (Signal/Noise) ratio favorably, and further, controls a gain by AGC (Auto Gain Control; processing, and performs A/D (Analog/Digital) conversion to output a digital image signal. The image signals from the pre-processing circuit 54 are also supplied to the white balance amplifier 42.

The amplifier-gain setting section 43 sets a control value of the white balance gain in accordance with the estimated light source on the basis of the estimation result by the light source estimation section 12. The set amplifier gain value is supplied to the white balance amplifier 42.

The amplifier-gain setting section 43 holds, for example, one group of RGB white balance gains gr, gg, and gb for each of a plurality of light sources in a look-up table provided in advance. And a group of white balance gains corresponding to a light source is read in accordance with a type of light source estimated by the light source estimation section 12, and is supplied to the white balance amplifier 42.

The white balance amplifier 42 controls gains of the individual RGB signal components in accordance with the white balance gains supplied from the amplifier-gain setting section 43, and performs white-balance adjustment processing on the image signals. The white balance amplifier 42 includes three variable gain amplifiers 42R, 42G, and 42B correspondingly to an R signal, a G signal, and a B signal, respectively. Each of the three variable gain amplifiers 42R, 42G, and 42B receives input of corresponding one of the RGB signals. The variable gain amplifiers 42R, 42G, and 42B perform amplification (or attenuation) of the R signal, the G signal, and the B signal in accordance with the gains set by the amplifier-gain setting section 43, respectively, and output the signals.

Figure 11:
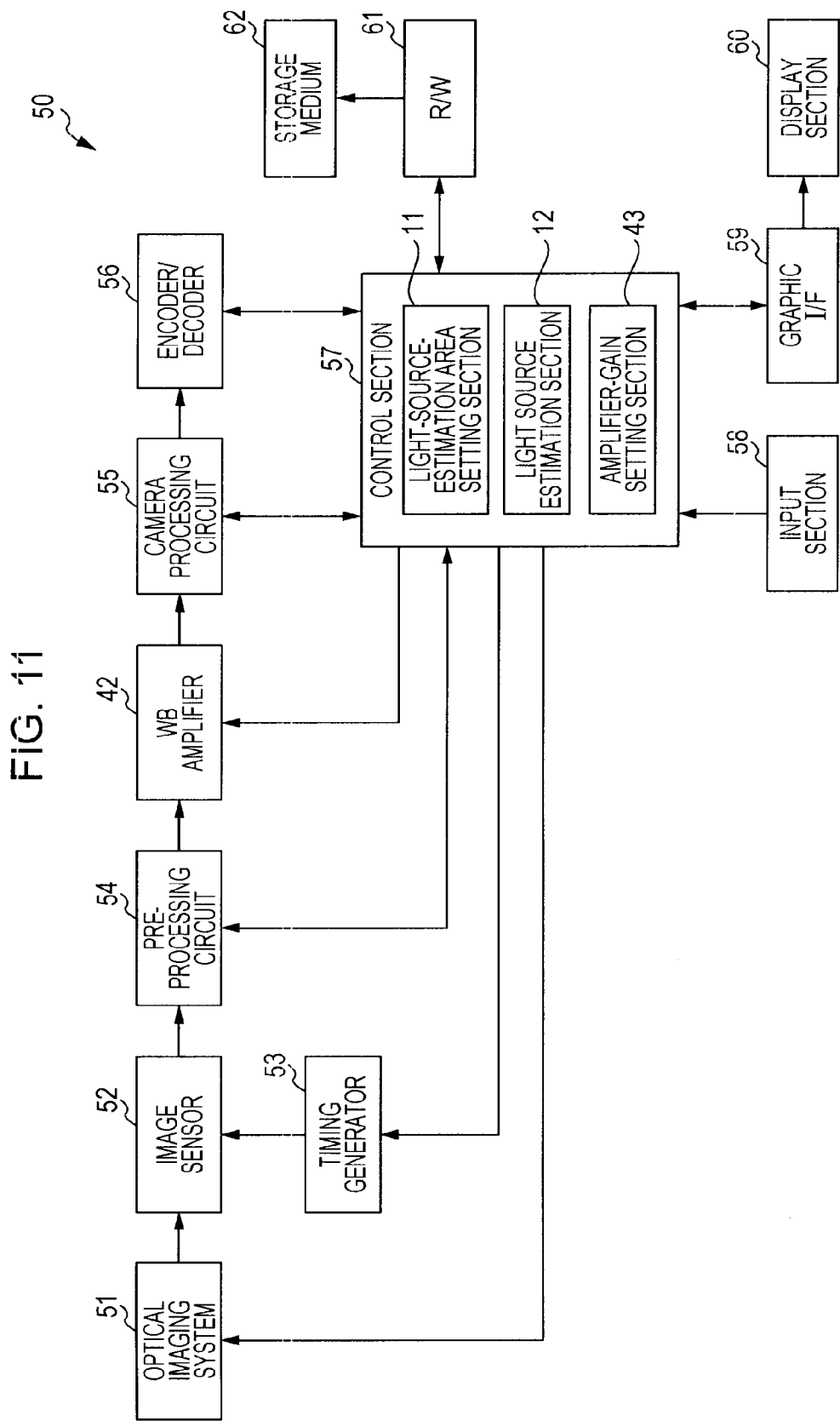
FIG. 11 is a block diagram illustrating a configuration of an imaging apparatus including a light source estimation device and a white-balance adjustment device.

5. Configuration of Imaging Apparatus Including Light Source Estimation Device and White-Balance Adjustment Device The above-described light source estimation device and white-balance adjustment device are applicable to, for example, an imaging apparatus. Thus, next, a description will be given of a configuration of an imaging apparatus 50 including functions of a light source estimation device and a white-balance adjustment device. FIG. 11 is a block diagram illustrating an overall configuration of the imaging apparatus 50.

The imaging apparatus 50 includes an optical imaging system 51, an image sensor 52, a timing generator 53, a pre-processing circuit 54, a white balance amplifier 42, a camera processing circuit 55, an encoder/decoder 56, a control section 57, a light-source-estimation area setting section 11, a light source estimation section 12, an amplifier-gain setting section 43, an input section 58, a graphic I/F (Interface) 59, a display section 60, a R/W (reader/writer) 61, and a storage medium 62.

The optical imaging system 51 includes a lens for condensing light from a subject onto the image sensor 52, a drive mechanism for moving the lens for focusing and zooming, a shutter mechanism, an iris mechanism, etc. These are driven on the basis of a control signal from the control section 57. An optical image of a subject obtained through the optical imaging system 51 is formed onto the image sensor 52 as an imaging device.

The image sensor 52 is driven on the basis of a timing signal output from the timing generator 53, performs photoelectric conversion on incident light from a subject into an amount of electric charge, and outputs the amount of electric charge as an analog imaging signal. The analog imaging signal output from the image sensor 52 is output to the pre-processing circuit 54. As the image sensor 52, a CCD (Charge Coupled Device), a CMOS (Complementary Metal Oxide Semiconductor), etc., are used. The timing generator 53 outputs a timing signal to the image sensor 52 under the control of the control section 57.

The pre-processing circuit 54 performs CDS (Correlated Double Sampling) processing on the analog imaging signal output from the image sensor 52 so as to perform sample holding in order to favorably maintain an S/N (Signal/Noise) ratio. Further, the pre-processing circuit 54 controls a gain by AGC (Auto Gain Control) processing, and performs A/D (Analog/Digital) conversion to output a digital image signal. The image signal is supplied from the pre-processing circuit 54 to the white balance amplifier 42. Also, in order to estimate a light source, the image signal is supplied from the pre-processing circuit 54 to the control section 57 that functions as a light source estimation device.

The white balance amplifier 42 constitutes the above-described white-balance adjustment device, and performs white-balance adjustment processing on the image signal supplied from the pre-processing circuit 54.

The camera processing circuit 55 performs, on the image signal from the pre-processing circuit 54, signal processing, for example, color correction processing, gamma correction processing, YC conversion processing, AF (Auto Focus) processing, AE (Auto Exposure) processing, etc.

The encoder/decoder 56 performs compression coding processing on the image signal from the camera processing circuit 55 in a predetermined still-image data format, such as a JPEG (Joint Photographic Coding Experts Group) system, etc.

The control section 57 includes, for example, a CPU, a RAM and a ROM, etc. The ROM stores programs that are read by the CPU and operated, etc. The RAM is used as a work memory for the CPU. The CPU issues commands in order to perform various kinds processing in accordance with the programs stored in the ROM so as to control the entire imaging apparatus 50. Also, the control section 57 executes a predetermined program so as to function as the light-source-estimation area setting section 11, the light source estimation section 12, and the amplifier-gain setting section 43, which constitute the light source estimation device and the white-balance adjustment device.

The input section 58 is an input means, for example, a power source button for turning on/off the power, a release button for instructing a start of recording a captured image, an operator for zoom adjustment, a touch panel accepting the other various kinds of input, etc. When the input section 58 receives input, the input section 58 generates a control signal in accordance with the input, outputs the control signal to the control section 57. And the control section 57 performs calculation processing and control in accordance with the control signal.

The graphic I/F 59 generates an image signal to be displayed on the display section 60 from the image signal supplied from the control section 57, and supplies the signal to the display section 60 in order to display the image. The display section 60 is a display means including, for example, an LCD (Liquid Crystal Display), a PDP (Plasma Display Panel), an organic EL (Electro Luminescence) panel, etc. The display section 60 displays a camera-through image being captured, an image recorded on the storage medium 62, etc.

The R/W 61 is an interface to which the storage medium 62 recording image data generated by shooting, etc., is connected. The R/W 61 writes the data supplied from the control section 57 onto the storage medium 62, and also outputs data read from the storage medium 62 to the control section 57. The storage medium 62 stores the image data generated by shooting, etc. The storage medium 62 is a large-capacity storage medium, for example, a hard disk, a memory stick (registered trademark of Sony Corporation), an SD memory card, etc. Images are stored in a state compressed in accordance with a standard, for example, JPEG, etc. Also, EXIF (Exchangeable Image File Format) data including additional information, such as information on stored images, shooting date and time, etc., is stored in association with the image.

Here, a description will be given of basic operations of the above-described imaging apparatus 50. Before capturing an image, signals produced by the image sensor 52 that has received light and performed photoelectric conversion are supplied to the pre-processing circuit 54 in sequence. The pre-processing circuit 54 performs CDS processing, AGC processing, etc., on the input signal, and further performs conversion to produce an image signal. And the image signal is supplied to the control section 57, and is subjected to light-source-estimation area setting, Light source estimation, and amplifier-gain setting. The white balance amplifier 42 performs white-balance adjustment processing on the image signal.

The camera processing circuit 55 performs image-quality correction processing on the image signal supplied from the white balance amplifier 42, and supplies the image signal to the graphic I/F 59 as a camera-through image through the control section 57. Thereby, the camera-through image is displayed on the display section 60. A user is allowed to adjust an angle of view while viewing the camera-through image displayed on the display section 60.

In this state, if the release button of the input section 58 is pressed, the control section 57 outputs control signals to the optical imaging system 51 and the timing generator 53 to operate the shutter included in the optical imaging system 51. Thereby, the image sensor 52 outputs an image signal for one frame.

The camera processing circuit 55 performs image-quality correction processing on the one-frame image signal supplied from the image sensor 52 through the pre-processing circuit 54, and supplies the processed image signal to the encoder/decoder 56. The encoder/decoder 56 performs compression coding on the input image signal, and supplies generated coded data to the R/W 61 through the control section 57. Thereby, a data file of the captured still image is stored onto the storage medium 62.

On the other hand, if an image file stored in the storage medium 62 is reproduced, the control section 57 reads, from the storage medium 62 through the R/W 61, a still image file selected in accordance with operation input from the input section 58. The read image file is supplied to the encoder/decoder 56, and is subjected to expansion decoding processing. And the decoded image signal is supplied to the graphic I/F 59 through the control section 57. Thereby, the still image stored in the storage medium 62 is displayed onto the display section 60.

In this regard, it is possible to achieve an image processing function in the imaging apparatus 50 described above by a computer. In that case, a program by which processing contents of the functions to be possessed by the imaging apparatus 50 is provided. And by executing the program on a computer, the above-described processing functions are achieved on the computer. The program describing the processing contents can be stored in the computer-readable storage medium 62, such as an optical disc, a semiconductor memory, etc.

If the program is distributed, for example, a portable storage medium, such as an optical disc or a semiconductor, etc., on which the program is stored, is marketed. Also, it is possible to store the program in a storage device of a server computer, and to transfer the program through a network.

The computer that executes the program stores, for example, a program that is stored in the portable storage medium or a program that is transferred from a server computer into an own storage device. And the computer reads the program from the own storage device, and executes processing in accordance with the program. In this regard, it is possible for the computer to directly read the program from the portable storage medium, and to execute processing in accordance with the program. Also, it is possible for the computer to execute processing in accordance with a program received in sequence for each time a program is transferred from the server computer.

6. Variations

In the above, a description has been specifically given of an embodiment of the present technique. However, the present technique is not limited to the above-described embodiment, and various variations are possible on the basis of the spirit and scope of the present technique. It is possible to apply a light source estimation device and a white-balance adjustment device according to the present technique to a digital video camera in addition to a digital still camera. Further, it is also possible to apply the light source estimation device and the white-balance adjustment device to a mobile phone, a smart phone, and a tablet terminal, etc., that are provided with a camera function. Also, it is possible to apply the present technique to image processing in a personal computer, a mobile phone, a smart phone, and a tablet terminal, etc., that are not provided with a camera function in addition to electronic devices having a camera function.

Also, it is possible to apply the present technique to a two-eye imaging apparatus that is provided with two optical imaging systems, such as imagers, etc., and image engines, etc., for a left eye and a right eye, and having a shooting function of a three-dimensional image (3D image). In this case, light source estimation and white balance adjustment may be performed independently for a left-eye image and a right-eye image. Also, light source estimation and white balance adjustment may be performed in common for a left-eye image and a right-eye image.

In this regard, it is possible to configure the present technique as follows.

(1) A light source estimation device including:

a light-source-estimation area setting section configured to detect a background in an image and to set a light-source-estimation area on the basis of a result of the background detection; and a light source estimation section configured to estimate a type of a light source when the image is captured on the basis of the light-source-estimation area.

(2) The light source estimation device according to (1), wherein the light-source-estimation area setting section is configured to detect a subject of interest in the image, and to determine an area excluding an area corresponding to the subject of interest from the image to be the background.

(3) The light source estimation device according to (2), wherein the light-source-estimation area setting section is configured to set the background as the light-source-estimation area.

(4) The light source estimation device according to (2), wherein if the subject of interest is a predetermined size or less, the light-source-estimation area setting section is configured to set the background as the light-source-estimation area.

(5) The light source estimation device according to any one of (1) to (4), wherein if the subject of interest is a predetermined size or more, the light-source-estimation area setting section is configured to set a whole area of the image as the light-source-estimation area.

(6) The light source estimation device according to any one of (1) to (5), wherein the light-source-estimation area setting section is configured to detect a highly saturated area having high saturation in the image, and to set an area excluding the highly saturated area from the image as the light-source-estimation area.

(7) The light source estimation device according to any one of (1) to (6), wherein the light-source-estimation area setting section is configured to detect a subject of interest in the image, and further to detect a highly saturated area having high saturation in the image, if an area excluding an area corresponding to the subject of interest and the highly saturated area is a predetermined size or less, the light-source-estimation area setting section is configured to set an area excluding the highly saturated area from the image as the light-source-estimation area.

(8) A method of estimating a light source, the method including:
detecting a background in an image and setting a light-source-estimation area on the basis of a result of the detecting the background; and
estimating a type of the light source when the image is captured on the basis of the light-source-estimation area.

(9) A program for causing a computer to perform a method of estimating a light source, the method including:
detecting a background in an image and setting a light-source-estimation area on the basis of a result of the detecting the background; and
estimating a type of the light source when the image is captured on the basis of the light-source-estimation area.

(10) An imaging apparatus including:
an imaging section configured to convert incident light into an electronic signal by capturing an image to generate an image signal;
a light-source-estimation area setting section configured to detect a background in the image generated by the imaging section and to set a light-source-estimation area on the basis of a result of the background detection; and
a light source estimation section configured to estimate a type of a light source when the image is captured on the basis of the light-source-estimation area.

The present disclosure contains subject matter related to that disclosed in Japanese Priority Patent Application JP 2011-250269 filed in the Japan Patent Office on Nov. 16, 2011, the entire contents of which are hereby incorporated by reference.

What is claimed is:

1. A light source estimation device comprising:
a light-source-estimation area setting section configured to detect a background in an image and to set a light-source-estimation area based on a result of the background detection, wherein the light-source-estimation area setting section detects a subject of interest in the image, and determines an area excluding an area corresponding to the subject of interest from the image to be the background; and
a light source estimation section configured to estimate a type of a light source when the image is captured based on the light-source-estimation area, wherein if the subject of interest is equal to or greater than a predetermined size, the light-source-estimation area setting section is configured to set an entire area of the image as the light source-estimation area.

2. The light source estimation device according to claim 1, wherein the light-source-estimation area setting section is configured to set the background as the light-source estimation area.

3. The light source estimation device according to claim 1, wherein if the subject of interest is equal to or less than the predetermined size, the light-source-estimation area setting section is configured to set the background as the light-source-estimation area.

4. The light source estimation device according to claim 1, wherein the light-source estimation area setting section is configured to detect a saturated area in the image having saturation equal to or greater than a predetermined threshold value, and to set an area excluding the saturated area from the image as the light-source estimation area.

5. The light source estimation device according to claim 1, wherein the light-source-estimation area setting section is configured to detect a subject of interest in the image and to detect a saturated area in the image having saturation equal to or greater than a predetermined threshold value, if an area excluding the area corresponding to the subject of interest and the saturated area is equal to or less than a predetermined size, the light source-estimation area setting section is configured to set an area excluding the saturated area from the image as the light-source-estimation area.

6. A method of estimating a light source, the method comprising:
detecting a background in an image and setting a light source-estimation area on the based on the detected background, wherein detecting the background comprises detecting a subject of interest in the image, and determining an area excluding an area corresponding to the subject of interest from the image to be the background; and
estimating a type of the light source when the image is captured on the basis of the light-source-estimation area, wherein if the subject of interest is equal to or greater than a predetermined size, an entire area of the image is set as the light source-estimation area.

7. A non-transitory computer-readable storage medium having stored thereon, a computer program having at least one code section, the at least one code section being executable by one or more processors for causing a computer to perform a method of estimating a light source, the method comprising:
detecting a background in an image and setting a light source-estimation area on the based on the detected background, wherein detecting the background comprises detecting a subject of interest in the image, and determining an area excluding an area corresponding to the subject of interest from the image to be the background; and estimating a type of the light source when the image is captured on the basis of the light-source-estimation area, wherein if the subject of interest is equal to or greater than a predetermined size, an entire area of the image is set as the light source-estimation area.

8. An imaging apparatus comprising:

an imaging section configured to convert incident light into an electronic signal by capturing an image to generate an image signal;

a light-source-estimation area setting section configured to detect a background in the image and to set a light-source-estimation area based on the detected background, wherein the light-source-estimation area setting section detects a subject of interest in the image, and determines an area excluding an area corresponding to the subject of interest from the image to be the background; and a light source estimation section configured to estimate a type of a light source when the image is captured on the basis of the light-source-estimation area, wherein if the subject of interest is equal to or greater than a predetermined size, the light-source-estimation area setting section is configured to set an entire area of the image as the light source-estimation area.

* * * * *